Sept. 29, 1970          D. A. NEWMAN          3,531,312
METHOD FOR MAKING A PRESSURE-SENSITIVE TRANSFER ELEMENT
AND THE RESULTING ARTICLE
Filed Jan. 10, 1968

INVENTOR.
Douglas A. Newman
BY
Johnson and Kline
ATTORNEYS

> # United States Patent Office

> 3,531,312
> Patented Sept. 29, 1970

3,531,312
METHOD FOR MAKING A PRESSURE-SENSITIVE TRANSFER ELEMENT AND THE RESULTING ARTICLE
Douglas A. Newman, Glen Cove, N.Y., assignor to Columbia Ribbon and Carbon Manufacturing Co., Inc., Glen Cove, N.Y., a corporation of New York
Continuation-in-part of application Ser. No. 615,938, Feb. 14, 1967. This application Jan. 10, 1968, Ser. No. 696,930
Int. Cl. B32b 3/00; B41c 1/06
U.S. Cl. 117—7
4 Claims

ABSTRACT OF THE DISCLOSURE

Process for producing a novel pressure-sensitive transfer element such as a carbon paper or business machine ribbon. A liquid ink composition is applied to a film foundation containing filler to provide a rough finish or to a plastic intermediate layer on such a film foundation, and the ink composition is solidified to cause it to bond to the irregular surface of the film foundation or to the irregular surface of the undercoating which conforms to the surface of the film foundation, to form a pressure-sensitive transfer element.

---

This application is a continuation-in-part of copending application Ser. No. 615,938, filed Feb. 14, 1967.

It is known in the transfer element art to use plastic films as foundations for carbon papers and ribbons. Such films have greater strength and durability than paper and do not absorb oils from the ink layer causing it to lose its frangibility as does paper. However, plastic film foundations present other problems not encountered with paper. Plastic films have a normally smooth surface which is not very receptive to an ink layer or retentive thereof, so that the application of an ink layer of uniform thickness is unreliable and the cracking or flaking of the ink layer from the foundation is common during use unless a separate resinous intermediate layer is used to bond the ink layer to the foundation. The intermediate layer must either be soluble in the solvent used to apply the ink layer, if a solvent coating, or must contain a high proportion of porous filler which absorbs the ink layer and permits bonding. Solvent-bonding is difficult to control whereas the incorporation of filler renders the transfer element less deformable under imaging pressure and thereby reduces the imaging quality of the transfer element.

A related disadvantage of conventional plastic film foundations is that they are not very receptive to printing inks or to pressure-applied images. Thus the rear surface of the foundation, opposite the one carrying the ink layer, is not receptive to the printing of trademarks or trade names unless a receptive resinous coating is applied first. Also transfer sheets of this type are not suitable for carbonless copy work since the rear surface of the foundation is not receptive to pressure-applied images and does not contrast in color therewith, due to the transparency of plastic films, unless a light-colored receptive layer is applied.

Among other disadvantages of plastic film foundations is their slippery nature which necessitates the application of a non-slip coating to the back surface to render the transfer sheet easier to handle and to use.

It is the object of the present invention to provide a plastic film foundation transfer element which has all of the advantages but none of the aforementioned disadvantages of conventional plastic film foundation transfer elements.

Figure 1:
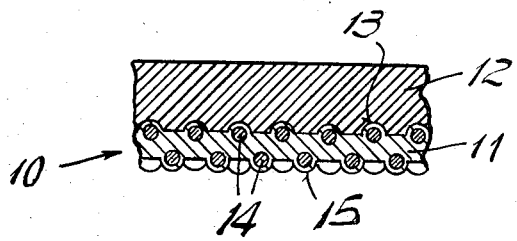
Figure 2:
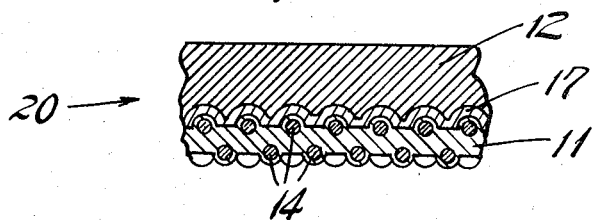
Figure 3:
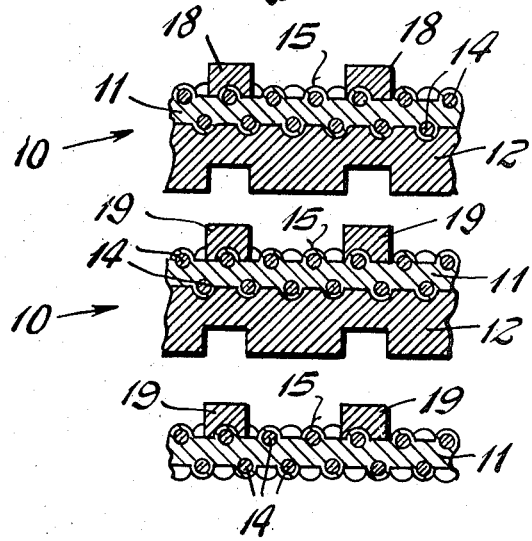

The objects and advantages of this invention will be clear to those skilled in the art in the light of the present disclosure including the drawings, in which:

FIGS. 1 to 3 are diagrammatic cross-sections, to an enlarged scale, of pressure-sensitive transfer elements according to different embodiments of the present invention.

The present invention resides in the discovery that the disadvantages of known plastic film foundations can be overcome without destroying the other advantageous properties thereof by extruding the film as a thin layer of a synthetic thermoplastic resin which has a thickness no greater than about 3 mils and comprises from 1% to 25% by weight of finely-divided inert filler particles and biaxially stretching the film to cause the resin to flow in around the inert particles and cause the particles to form surface projections on the film without rupturing therethrough to any substantial extent. Films of this type are found to have a uniformly rough or matte-type surface containing a multiplicity of small projections or humps which make them very receptive to and retentive of ink coatings and pressure-applied images and renders them slip-resistant and easier to handle and use. Such films are opaque and white or light-colored in appearance due to the included inert filler and air.

The filled film foundations used according to the present invention are well known and are produced by melting a film-forming synthetic thermoplastic resin and mixing therewith from 1% to 25% by weight of an inert filler, extruding the composition as a thin sheet, and thereafter stretching or orienting the film biaxially to form an opaque film of the desired thickness and having a uniformly rough or grainy surface.

The preferred film-forming synthetic thermoplastic resins are based upon polyethylene terephthalate polyester, polyethylene, polypropylene, polystyrene, chlorinated rubber, polyvinyl chloride, polyvinyl fluoride, nylon, and the like. The preferred fillers are inert incompressible particles having a diameter ranging between 0.3 and 20 microns, and most preferably between 1 and 5 microns. Illustrative fillers include calcium carbonate, clay, silica, titania, glass, mica, and the like.

According to the preferred embodiment of this invention, the filled film serves as a direct foundation for a microporous ink-releasing layer of the squeeze-out type. As shown in FIG. 1, the transfer element 10 has a filled film foundation 11 and an ink-releasing layer 12. The filled film has uniformly uneven surfaces 13 and 15 and cotains enveloped filler particles 14 withi voids which also contains enveloped filler particles 14 within voids which also contain entrapped gas which apparently is air. The ink layer 12 is firmly bonded to the uneven surface 13 of the foundation and will not separate therefrom during use.

This is particularly important in the case of solvent-applied microporous synthetic thermoplastic resinous ink layers containing pressure-exudable ink within the pores thereof. The resin structure is bonded to the film due to its rough surface and is pressure non-transferable. Suitable compositions for forming the present squeeze-out ink layers are illustrated by U.S. Pats. Nos. 2,820,717; 2,-944,037; 3,037,879 and 3,117,018, among others. However, the volatile organic solvent used to apply the ink layer to the film must be a non-solvent for the film so that the film is undisturbed. Otherwise the film loses its strength and other beneficial properties.

FIG. 2 of the drawings illustrate a second embodiment in which a transfer element 20, intended for heavy duty work such as for use as a business machine ribbon, is provided with a thin layer of synthetic thermoplastic resin as an undercoating 17 to provide an improved bond between the film foundation 11 and the ink layer 12. The undercoating is generally a vinyl resin applied as a solution in a volatile organic solvent which must be a non-solvent for the film foundation, and is applied in a thickness of less than about 3 points (0.0003 inch) so that its surface 17 corresponds closely to the rough surface of the foundation and is more receptive to and retentive of the ink layer. If desired, the ink layer may be applied to the undercoating using a volatile organic solvent which is at least a partial solvent for the undercoating to effect solvelt-bonding therewith in the manner described in U.S. Pat. No. 3,037,879. However, care must be taken to avoid contact between the solvent and the film foundation if the solvent is a solvent for the latter also.

FIG. 3 of the drawings illustrates the use of a number of transfer elements 10 in a carbonless copying system. The rear surface 15 of the filled films 11 is receptive to and retentive of both typed images 18 and pressure-transferred images 19. The opaqueness of the filled films 11 masks the color of the underlying transfer layers 12 and the white or light appearance of the films provides a good contrast with the images 18 and 19 applied thereover.

Since no separate receptor layers are required in the embodiment of FIG. 3, the superposed pack is thinner than heretofore possible with plastic film foundations which require separate receptor layers and therefore a great number of sharp, clear copies can be produced. The filled film foundations are preferably 0.5 mil thick and the ink layers 12 are preferably from 0.2 to 0.6 mil thick according to this embodiment.

The filled foundations useful according to the present invention are produced in known manner by adding the filler, such as calcium carbonate, to a melted film-forming synthetic thermoplastic polymer, such as polyethylene terephthalate polyester, or by forming the polymer in the presence of the filler. Preferably about 5% by weight of filler is added, based upon the weight of polymer, and the filler particles range in size between 1 and 5 microns. The composition is mixed, such as by extrusion milling, to produce a uniform blend and is then extruded as a translucent, thin film. The extruded film is heated beyond its second stage transition temperature but below its softening or melting temperature, i.e. about 180° F. for polyethylene terephthalate polyester, and biaxially stretched to about three times its original dimensions to form an opaque film of excellent strength and having the surface properties discussed supra.

The initial extruded film is translucent since the polymer and filler particles have a similar refractive index. However the stretching operation apparently causes the polymer to separate partially from the filler particles and create air voids in the pockets containing the filler particles. These air voids render the stretched film very opaque and grey-white in color. The stretching operation also draws out the film polymer so that the filler particles adjacent the surfaces protrude as polymer-covered projections or humps to form a uniformly rough or matte-like finish on each surface. Few, if any, of the particles break through the surface unless excessive stretching is conducted. The final stretched film has a thickness no greater than about 2 mils and preferably from 0.5 to 1 mil.

The following examples are given by way of illustration and should not be considered limitative.

EXAMPLE 1

A transfer element according to FIG. 1 is prepared by applying the following ink composition to a 0.5 mil polyethylene terephthalate polyester film containing 5% by weight of calcium carbonate particles ranging from 1 to 5 microns in size and produced as disclosed supra:

| Ingredients: | Parts by weight |
| --- | --- |
| Nylon (alcohol-soluble) | 10 |
| Oleic acid | 10 |
| Carbon black | 1 |
| Black toner | 2 |
| Nigrosine | 3 |
| Talc | 7 |
| Ethyl alcohol | 90 |

The ink composition is applied to the rough surface of the film in a thickness of about 4 mils and heat is applied to evaporate the solvent and form a solidified ink layer having a thickness of about 1.0 mil. The ink layer is firmly bonded to the foundation and shows no tendency to peel or crack or transfer bodily therefrom under repeated use.

EXAMPLE 2

A transfer element according to FIG. 2 is prepared by applying a thin layer of a 20% solution of polyvinylidene chloride in methyl ethyl ketone as an undercoating composition to a 0.5 mil filled polystyrene film containing 8% by weight of silica particles ranging from 1 to 5 microns in size and produced in the manner described. The methyl ethyl ketone is evaporated to form a dried undercoating having a thickness of about 2 points.

The following ink composition was applied over the undercoating:

| Ingredients: | Parts by weight |
| --- | --- |
| Vinyl chloride-vinyl acetate copolymer (Vinylite VYHH) | 15.0 |
| Mineral oil | 10.0 |
| Rapeseed oil | 8.0 |
| Toned carbon black | 7.0 |
| Blue toning paste | 3.0 |
| Lecithin | 1.0 |
| Ethyl acetate | 36.0 |
| Toluol | 20.0 |
| | 100.0 |

The ink layer was dried by heating to an elevated temperature in a drying tunnel to remove the solvents and form an ink layer having a thickness of about 0.5 mil.

The formed transfer element is particularly useful as a continuous wide ribbon for use in calculators, adding machines and similar business machines where the additional strength and durability is important.

EXAMPLE 3

A so-called carbonless manifolding system as shown in FIG. 3 is produced by applying the following transfer composition to a web of 0.5 mil filled polyethylene terephthalate polyester of the type used in Example 1:

| Ingredients: | Parts by weight |
| --- | --- |
| Polystyrene | 1.3 |
| Ethyl cellulose | 1.2 |
| Polybutene resin | 0.5 |
| Lanolin | 1.0 |
| Clay | 17.0 |
| Graphite | 2.0 |
| Methyl isobutyl ketone | 15.0 |
| Toluene | 62.0 |

The ingredients are uniformly mixed and applied to the web and the solvents are evaporated at elevated temperatures in a heating tunnel to form a solidified pressure-transferable layer having a thickness of about 6 points. The layer is clean to the touch and rub-resistant due to its resinous composition.

The web is then cut into sheet lengths and superposed sheets are used for the simultaneous production of multiple copies in the manner shown in FIG. 3. Up to eight or more good copies can be produced in this manner and each copy is a good record copy because of the sharpness and clarity of the images thereon and the cleanliness of the pressure-transferable imaging layer.

Other conventional donor coatings of this type are also suitable and are well known to those skilled in the art. Included among such coatings are those described in U.S. Pats. Nos. 3,169,880; 3,186,862 and 3,243,312.

When transfer sheets are being produced for conventional carbon paper use, the pressure-transferable layer may be of the conventional wax type applied by hot melt techniques.

Variations and modifications may be made within the scope of the claims and portions of the improvements may be used without others.

I claim:

1. The process of producing a slip-resistant pressure-sensitive transfer element which is exceptionally light in weight and exceptionally deformable under the effect of imaging pressure which comprises the steps of:
    (a) providing an opaque plastic film foundation having a thickness no greater than about 2 mils comprising a polymer structure containing from 1% to 25% by weight of inert filler particles up to 20 microns in diameter, said foundation being stretched to cause the particles to produce uniformly rough front and back surfaces thereon which are ink-retentive and to cause the particles and polymer to break adhesion to some extent and render the film opaque,
    (b) applying a thin layer of a fluid ink composition to the rough front surface of said foundation comprising a synthetic thermoplastic resinous binder material, an oil which is incompatible with said binder material, coloring matter and a volatile organic solvent for said binder material which is a non-solvent for the surface of said foundation, and
    (c) solidifying said ink composition by evaporation of said solvent to cause it to bond to said foundation due to the roughness of the surface thereof as a pressure non-transferable microporous structure of said binder material containing within the pores thereof said oil and coloring matter as a pressure-exudable ink, whereby the solidified layer of ink composition resists flaking and peeling from the foundation but transfers portions thereof to a copy sheet such as to the back surface of an identical transfer element under the effect of imaging pressure.

2. The process of claim 1 in which the filler particles range between 1 and 5 microns in diameter.

3. The process of claim 1 in which the filler particles comprise calcium carbonate.

4. A slip-resistant pressure-sensitive transfer element produced according to claim 1.

References Cited

UNITED STATES PATENTS

| | | | |
|---|---|---|---|
| 2,416,673 | 3/1947 | Asnes | 117—3.5 |
| 3,049,457 | 8/1962 | Peshin et al. | 117—3.1 XR |
| 3,154,461 | 10/1964 | Johnson | 161—124 XR |
| 3,303,046 | 2/1967 | Chebiniak et al. | 117—36.1 |

ROBERT F. BURNETT, Primary Examiner

W. A. POWELL, Assistant Examiner

U.S. Cl. X.R.

117—36.1, 36.4, 138.8; 161—119, 164